United States Patent
Hsu

(10) Patent No.: US 8,582,482 B2
(45) Date of Patent: Nov. 12, 2013

(54) METHOD OF AVOIDING MONITORING USELESS DYNAMIC SCHEDULING INFORMATION OF MULTIMEDIA BROADCAST MULTICAST SERVICE IN A WIRELESS COMMUNICATION SYSTEM AND RELATED COMMUNICATION DEVICE

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 457 days.

(21) Appl. No.: 12/939,175

(22) Filed: Nov. 4, 2010

(65) Prior Publication Data

US 2011/0274025 A1 Nov. 10, 2011

Related U.S. Application Data

(60) Provisional application No. 61/258,218, filed on Nov. 5, 2009.

(51) Int. Cl.
*H04H 20/71* (2008.01)
(52) U.S. Cl.
USPC .......................................... 370/311; 370/312
(58) Field of Classification Search
None
See application file for complete search history.

(56) References Cited

U.S. PATENT DOCUMENTS

| | | | |
|---|---|---|---|
| 2008/0025240 A1* | 1/2008 | Casaccia et al. | 370/312 |
| 2009/0300468 A1* | 12/2009 | Pekonen | 714/776 |
| 2011/0080859 A1* | 4/2011 | Phan et al. | 370/312 |
| 2011/0194428 A1* | 8/2011 | Wang et al. | 370/252 |

FOREIGN PATENT DOCUMENTS

| | | |
|---|---|---|
| CN | 1147892 A | 4/1997 |
| CN | 101296102 A | 10/2008 |
| EP | 1585351 A1 | 10/2005 |
| WO | 9526112 | 9/1995 |

OTHER PUBLICATIONS

3GPP Technical Specification Group Radio Access Network; Evolved Universal Terrestrial Radio Access (E-UTRA) and Evolved Universal Terrestrial Radio Access Network (E-UTRAN);Overall description Stage 2 (Release 9) v9.1.0, Sep. 2009.
3GPP Technical Specification Group Radio Access Network; Evolved Universal Terrestrial Radio Access (E-UTRA) MAC protocol specification (Release 9) v9.0.0, Sep. 2009.
3GPP Technical Specification Group Radio Access Network; Evolved Universal Terrestrial Radio Access (E-UTRA) RRC protocol specification (Release 9) v9.0.0, Sep. 2009.
3GPP Technical Specification Group Services and System Aspects; Multimedia Broadcast/Multicast Service Stage 1 (Release 9) v9.0.0, Jun. 2008.
Office action mailed on Feb. 27, 2013 for the China application No. 201010543542.5, filed Nov. 5, 2010, p. 1-6.
European patent application No. 10014340.3, European application filed: Nov. 5, 2010 , European Search Report mailing date: Mar. 8, 2011.

(Continued)

*Primary Examiner* — Min Jung
(74) *Attorney, Agent, or Firm* — Winston Hsu; Scott Margo

(57) ABSTRACT

A method of avoiding monitoring useless dynamic scheduling information (DSI) of multimedia broadcast multicast service (MBMS) for a user equipment of a wireless communication system includes identifying a service type of an ongoing MBMS service, detecting whether the MBMS service is received when the MBMS service is identified as a short session service, and informing a lower layer to stop monitoring DSI when the MBMS service is received.

4 Claims, 7 Drawing Sheets

(56) References Cited

OTHER PUBLICATIONS

ETSI TS 125 346 V8.3.0 (Apr. 2009), "Universal Mobile Telecommunications System (UMTS)"; Introduction of the Multimedia Broadcast/Multicast Service (MBMS) in the Radio Access Network (RAN); Stage 2 (3GPP TS 25.346 version 8.3.0 Release 8), XP014044007, pp. 1-73.

Office action mailed on Mar. 28, 2011 for the European application No. 10014340.3, filed Nov. 5, 2010, pp. 1-7.

\* cited by examiner

US 8,582,482 B2

METHOD OF AVOIDING MONITORING USELESS DYNAMIC SCHEDULING INFORMATION OF MULTIMEDIA BROADCAST MULTICAST SERVICE IN A WIRELESS COMMUNICATION SYSTEM AND RELATED COMMUNICATION DEVICE

CROSS REFERENCE TO RELATED APPLICATIONS

This application claims the benefit of U.S. Provisional Application No. 61/258,218, filed on Nov. 5, 2009 and entitled "METHOD AND APPARATUS FOR DRX configuration on MBMS IN A WIRELESS COMMUNICATIONS SYSTEM", the contents of which are incorporated herein.

BACKGROUND OF THE INVENTION

1. Field of the Invention

A method of avoiding monitoring useless dynamic scheduling information (DSI) of a multimedia broadcast multicast service (MBMS) in a wireless communication system and related communication device is provided, and more particularly, a method of avoiding monitoring useless DSI for a user equipment when the UE receives intermittent services or short session services and related communication device is provided.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. The 3GPP is now involved in the further advancements for E-UTRA and proposes an LTE-Advanced system as an enhancement of the LTE system. In the LTE system, an evolved universal terrestrial radio access network (E-UTRAN) includes a plurality of evolved Node-Bs (eNBs) and communicates with a plurality of mobile stations, also referred as user equipments (UEs). The LTE protocol stack can be segmented into access stratum (AS) layer and non-access stratum (NAS) layer. The AS layer includes sublayers as Layer 3, also known as the Radio Resource Control (RRC) layer, Layer 2, consisting of three sub-layers that are the Packet Data Convergence Protocol (PDCP) layer, the Radio Link Control (RLC) layer, and the Medium Access Control (MAC) layer, and Layer 1, also known as the Physical (PHY) layer. The NAS layer processes the signaling between the UE and the core network.

Evolved multimedia broadcast multicast service (E-MBMS) has been introduced in the LTE specification to broadcast or multicast TV, films, information such as free overnight transmission of newspaper in a digital form. Two important scenarios have identified for the E-MBMS: one is single-cell broadcast, and the other is E-MBMS single frequency network (MBSFN). The MBSFN is a simulcast transmission technique that realizes transmission of identical waveforms at the same time from multiple cells covering a geographic area called an MBSFN area. To realize E-MBMS, the PHY layer of the LTE system offers information transfer services between a physical multicast channel (PMCH) and a downlink transport channel called multicast channel (MCH). The MCH is required to be broadcasted in the entire coverage area of each cell in the MBSFN area. Scheduling of each MCH is done by a multicast coordination entity (MCE), which can be a part of a network except the E-UTRAN. The MAC layer of the LTE system offers data transfer services between the MCH and logical channels including a multicast traffic channel (MTCH) and a multicast control channel (MCCH), which are point-to-multipoint channels for transmitting traffic data and control information. MCCH is transmitted every MCCH repetition period and MCCH may change in a MCCH modification period, in which the same MCCH information may be transmitted a number of times.

The MBSFN transmission takes place on dedicated subframes referred to as MBSFN subframes. Within MBSFN subframes, the transmission of a specific MCH carrying MTCH occupies a pattern of subframes which are not necessarily adjacent in time, called MCH subframe allocation pattern (MSAP). The MSAP for every MCH carrying MTCH is signalled on the MCCH. The MSAP occasion comprises a set of subframes defined by the MSAP during a certain period. A UE determines what subframes are used by each MTCH in the MSAP occasion according to a dynamic scheduling information (DSI), which is generated by the eNB and allocated in the first subframe of the MSAP occasion. The DSI includes values as stop indications for indicating the last subframe of each MTCH. Except the values used as stop indications of MTCH, there are several values reserved for further usage. When an MBMS service is ongoing, one or more sessions are sequentially generated with respect to the corresponding MBMS service.

For an intermittent service which has the updated frequency in a range of tens of seconds or even minute, like a news ticker or a stock ticker, it may only have one active MBMS session in several MSAP occasions. If a UE only subscribes to this kind of service, the UE still needs to wake up to receive DSIs according to the MSAP periodicity even though most of times the received DSIs includes no scheduling information for the intermittent service. These periodical wakeups consume UE power with no any actual gain.

For a short session service, like file download, the actual transmission may be much shorter than the MCCH modification period, which is 5.12 seconds or 10.24 seconds in the current specification. Since there is no session end notification, a UE cannot stop monitoring DSI until a next MCCH modification period. A UE may monitor DSI for receiving a short session service at all MSAP occasions in a long MCCH modification period, such as 10.24 seconds, and find MBMS sessions in MSAP occasions of only 1 second, which indicates that 90% of the DSI monitoring is fruitless and wastes power.

SUMMARY OF THE INVENTION

The present disclosure therefore provides a method of avoiding monitoring useless DSI of MBMS in a wireless communication system and related communication device.

A method of avoiding monitoring useless DSI of MBMS for a UE of a wireless communication system is disclosed. The method includes identifying a service type of an ongoing MBMS service, detecting whether the MBMS service is received when the MBMS service is identified as a short session service, and stopping monitoring DSI when the MBMS service is received.

A method of avoiding monitoring useless DSI of MBMS for a network of a wireless communication system is disclosed. The method includes when a short session service a UE of the wireless communication system subscribes to is stopped at an MSAP occasion, transmitting a DSI including a service stop indication for indicating the short session service is stopped to the UE at a next MSAP occasion; and when an intermittent service the UE subscribes to is not available in a period of time at an MSAP occasion, transmitting a DSI including a service suspend indication corresponding to the period of time to the UE at a next MSAP occasion.

A method of avoiding monitoring useless DSI of MBMS for a UE of a wireless communication system is disclosed. The method includes receiving a DSI; when a service stop indication for indicating a short session service is stopped is included in the DSI, stopping monitoring DSI; when a service suspend indication for indicating that no session of an intermittent service is available in a period of time is included in the DSI, suspending monitoring DSI for the period of time indicated by the service suspend indication; and resuming monitoring DSI when a next session of the intermittent service arrives.

A method of avoiding monitoring useless DSI of MBMS for a network of a wireless communication system is disclosed. The method includes when a short session service a UE of the wireless communication system subscribes to is stopped at an MSAP occasion, transmitting a DSI including a stop indication of MTCH corresponding to the short session service and a service stop indication for indicating the short session service is stopped to the UE at the MSAP occasion, and when an intermittent service the UE subscribes to is not available in a period of time at an MSAP occasion, transmitting a DSI including a stop indication of MTCH corresponding to the intermittent service and a service suspend indication corresponding to the period of time to the UE at the MSAP occasion.

To implement the aforementioned methods, communication devices in a wireless communication system are disclosed. Each communication device corresponding to a method includes means for performing one of steps of the method, for avoiding monitoring useless DSI of MBMS.

These and other objectives of the present disclosure will no doubt become obvious to those of ordinary skill in the art after reading the following detailed description of the examples that is illustrated in the various figures and drawings.

DETAILED DESCRIPTION

Figure 1:
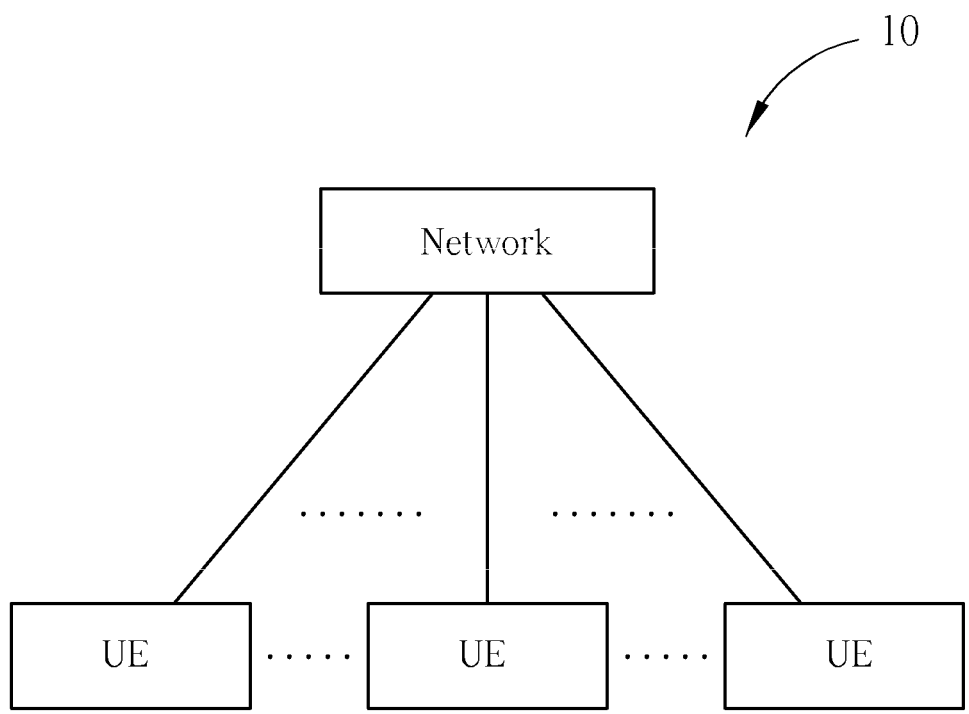
FIG. 1 is a schematic diagram of an exemplary wireless communication system.

Please refer to FIG. 1, which illustrates a schematic diagram of an examplary wireless communication system 10. Briefly, the wireless communication system 10 is composed of a network referred as an E-UTRAN including a plurality of evolved Node-Bs (eNBs) and a plurality of mobile devices referred as user equipments (UEs), such as mobile phones, computer systems, etc. The wireless communication system 10 can be a LTE system, a LTE-advanced system, or any other similar network system supporting evolved multimedia broadcast multicast service (E-MBMS).

Figure 2:
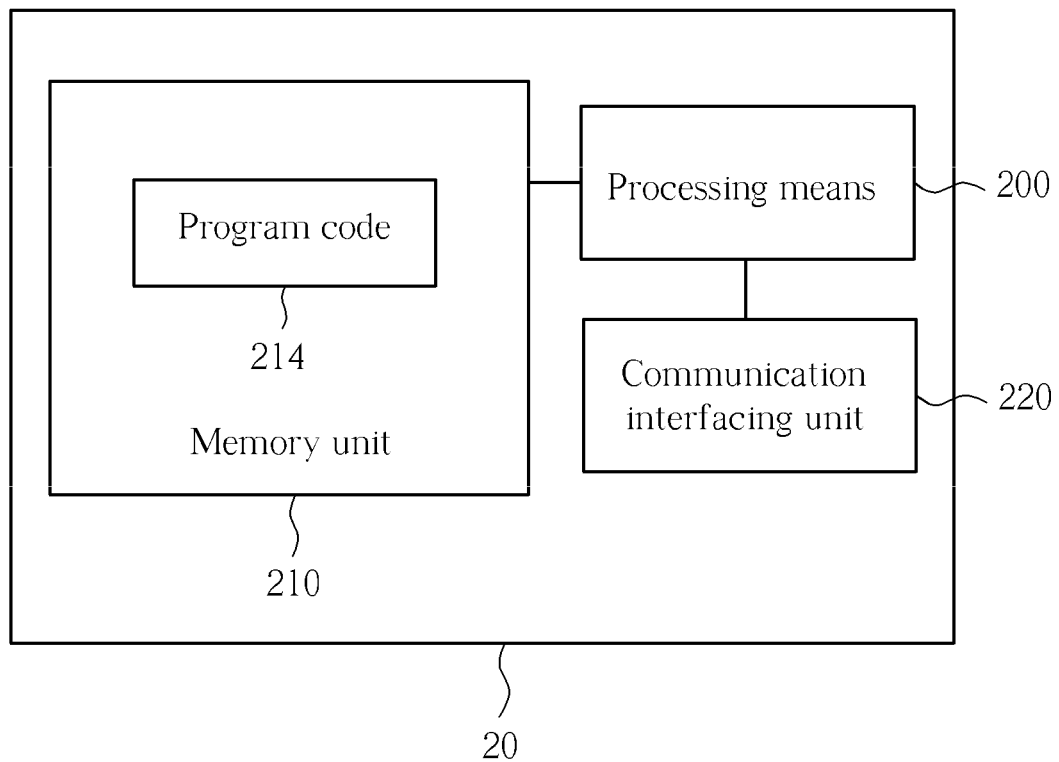
FIG. 2 is a schematic diagram of an exemplary communication device.

Please refer to FIG. 2, which is a schematic diagram of an exemplary communication device 20. The communication device 20 can be the UE or the network shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), flash memory, random-access memory (RAM), CD-ROM, magnetic tape, floppy disk, and optical data storage device. The communication interfacing unit 220 is preferably a radio transceiver for wirelessly communicating according to processing results of the processing means 200.

Figure 3:
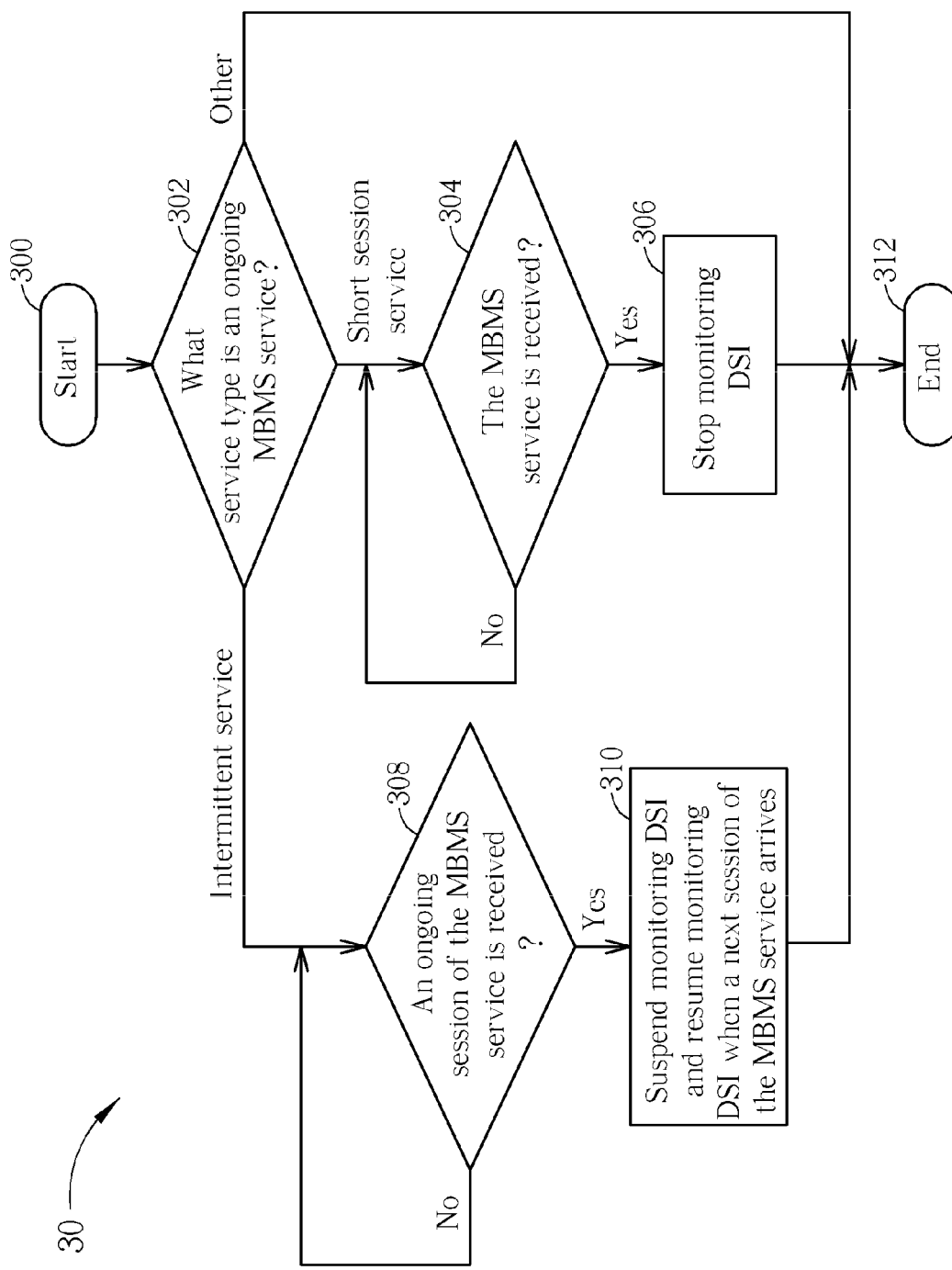
FIG. 3 to FIG. 7 are flowcharts of exemplary processes.

In the prior art, when the UE subscribes to an intermittent service, e.g. news ticker or stock ticker, or a short session service, e.g. file download, the UE has to monitor dynamic scheduling information (DSI) for every multicast channel subframe allocation pattern (MSAP) occasion even though the subscribed MBMS service is not available for a while or stopped, which results in unnecessary power consumption. To improve efficiency of power consumption when receiving intermittent services and short session services, a method at the UE side is provided. Please refer to FIG. 3, which is a flowchart of an exemplary process 30. The process 30 is utilized for avoiding monitoring useless DSI for a UE of the wireless communication system 10. The process 30 can be compiled into the program code 214. The process 30 includes the following steps:

Step 300: Start.

Step 302: Identify a service type of an ongoing MBMS service. When the MBMS service is a short session service, perform Step 304; when the MBMS service is an intermittent service, perform Step 308; otherwise, perform Step 312.

Step 304: Detect whether the MBMS service is received. If yes, perform Step 306; else, continue Step 304.

Step 306: Stop monitoring DSI.

Step 308: Detect whether an ongoing session of the MBMS service is received. If yes, perform Step 310; else, continue Step 308.

Step 310: Suspend monitoring DSI and resume monitoring DSI when a next session of the MBMS service arrives.

Step 312: End.

The process 30 can be performed by the application layer of the UE, e.g. NAS layer, and the application layer is supposed to be able to identify the type of a subscribed MBMS service, know when MBMS sessions arrive at the UE, and control a lower layer such as the MAC layer to receive MBMS sessions or turn off the reception of MBMS sessions. According to Step 302, the UE identifies a service type of an ongoing MBMS service and thereby selectively performs different steps by the service type.

When the ongoing MBMS service is identified as a short session service, the UE detects whether the MBMS service is received according to Step 304. When the MBMS service is received, i.e., all sessions of the MBMS service are completely received, the UE stops monitoring DSI according to Step 306. In other words, the UE does not monitor DSI carrying useless information in the remaining MSAP occasions after the short session service is received until a next MCCH modification period begins.

When the ongoing MBMS service is identified as an intermittent service, the UE detects whether an ongoing session of the MBMS service is received according to Step 308. Note that, the reason why Step 308 is different from Step 304 is that useless DSI reception mostly occurs during the time between two sessions of the intermittent service. When the ongoing session is received, according to Step 310, the UE suspends monitoring DSI and resumes monitoring DSI when a next session of the MBMS service arrives. When the ongoing MBMS service is neither a short session service nor an intermittent service, the UE terminates the process 30. How to deal with DSI under other types of MBMS services is not included in the process 30.

In the prior art, power consumption of the UE is not efficient enough because for the short session service such as file download, the UE can only find MBMS sessions in a short time and have to receive useless DSI during a long MCCH modification period, and for the intermittent service such as a news/stock ticker, the UE receives DSI even though no session of the intermittent service is available. In comparison, through the process 30, the UE save lots of power wasted on monitoring useless DSI when performing short session services or intermittent services.

Figure 4:
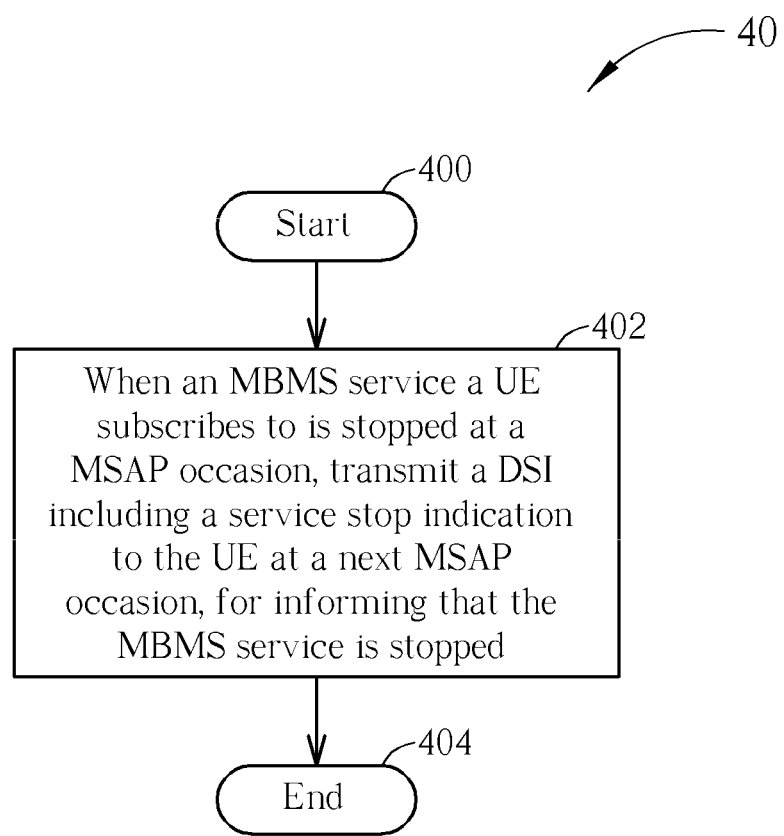

To improve the problem of monitoring useless DSI, not only the process 30 at the UE side but also processes at the eNB side are provided. Please refer to FIG. 4, which is a flowchart of an exemplary process 40. The process 40 is utilized for avoiding monitoring useless DSI for a network as an eNB of the wireless communication system 10. The process 40 can be compiled into the program code 214. The process 40 includes the following steps:

Step 400: Start.

Step 402: When an MBMS service a UE subscribes to is stopped at an MSAP occasion, transmit a DSI including a service stop indication to the UE at a next MSAP occasion, for informing the UE that the MBMS service is stopped.

Step 404: End.

As mentioned previously, except the values which may be used as stop indications of MTCH, there are values reserved for further usage. In the process 40, one of the reserved values is used as a service stop indication for indicating the MBMS service is stopped and this value may be specific and stored in the eNB and the UE. According to the process 40, when the MBMS service the UE subscribes to is stopped at an MSAP occasion, denoted as $P_n$, the eNB transmits a DSI including a service stop indication to the UE at an MSAP occasion $P_{n+1}$, for informing the UE that the MBMS service is stopped.

Figure 5:
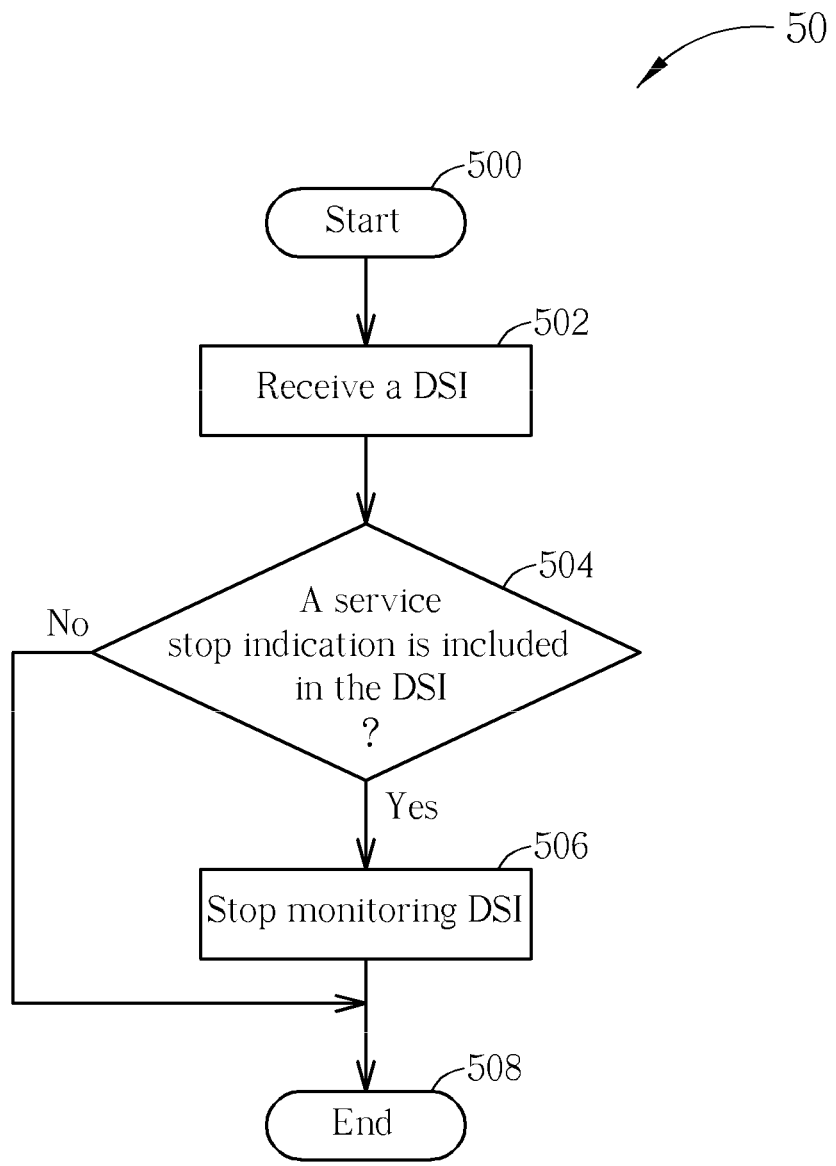

The eNB performing the process 40 cooperates with the UE performing an exemplary process 50 shown in FIG. 5, which is utilized for avoiding monitoring useless DSI at the UE side. The process 50 can be compiled into the program code 214. The process 50 includes the following steps:

Step 500: Start.

Step 502: Receive a DSI.

Step 504: Determine whether a service stop indication is included in the DSI. If yes, perform Step 506; else, perform Step 508.

Step 506: Stop monitoring DSI.

Step 508: End.

According to the process 50, after the UE receives the DSI at the MSAP occasion $P_{n+1}$, the UE determines whether the service stop indication is in the DSI, in other words, the UE determines whether a specific value (used as the service stop indication) is in the DSI. When the service stop indication is in the DSI, the UE knows that the subscribed MBMS service is stopped and DSIs in the following MSAP occasions carry useless information. Therefore, the UE stops monitoring DSI. The process 40 and the process 50 are helpful to the UE which subscribes to a short session service since the UE does not need to wake up frequently to receive useless DSI after the short session service is received, and power consumption of the UE is reduced.

Figure 6:
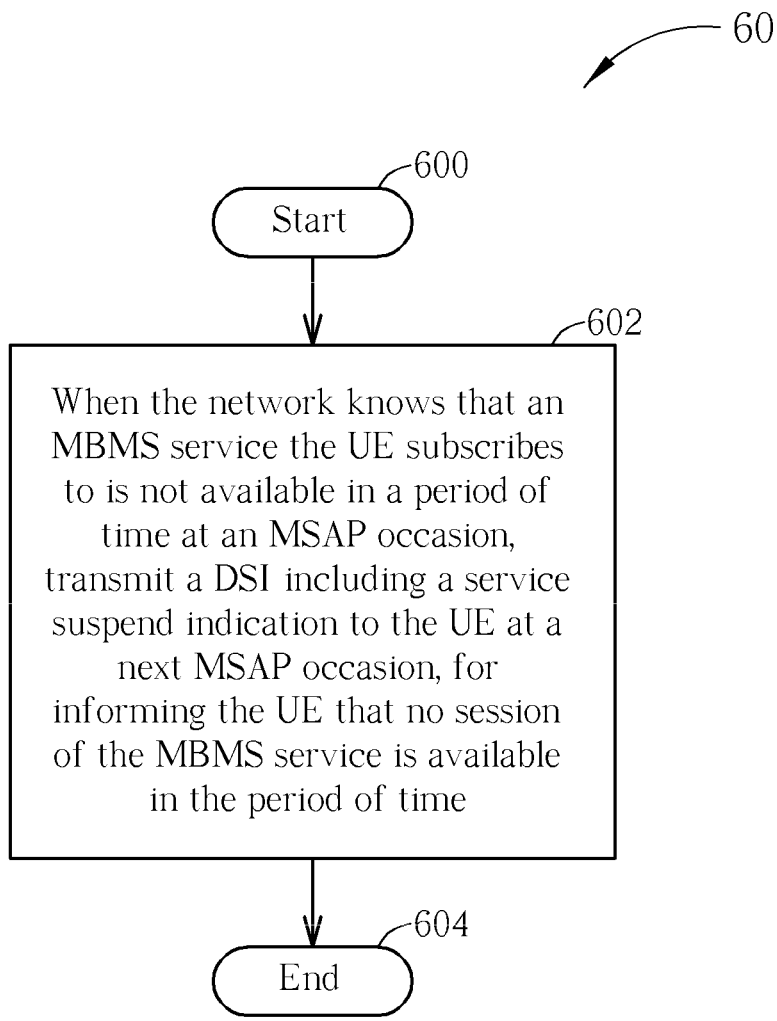

For the intermittent service, processes to avoid monitoring useless DSI are provided. Please refer to FIG. 6, which is a flowchart of an exemplary process 60. The process 60 is utilized for avoiding monitoring useless DSI for a network of the wireless communication system 10. The process 60 can be compiled into the program code 214. The process 60 includes the following steps:

Step 600: Start.

Step 602: When the network knows that an MBMS service the UE subscribes to is not available in a period of time at an MSAP occasion, transmit a DSI including a service suspend indication corresponding to the period of time to the UE at a next MSAP occasion, for informing the UE that no session of the MBMS service is available in the period of time.

Step 604: End.

As mentioned previously, there are several values reserved for further usage. In the process 60, several reserved values may be as service suspend indications for indicating periods of times during which no session of the MBMS service is available until a next session arrives, and these values may be stored in the eNB and the UE. Generally, the period of time can be represented as the number of MSAP occasions. The eNB is supposed to know the period of time when no session of the MBMS service is available, which is controlled by the eNB or MCE.

According to the process 60, at an MSAP occasion $P_n$, when the eNB knows that the MBMS service the UE subscribes to is not available in m MSAP occasions, the eNB transmits a DSI including a service suspend indication corresponding to m MSAP occasions to the UE at a next MSAP occasion $P_{n+1}$, for informing the UE that the MBMS is not available in m MSAP occasions from $Pn_{n+1}$ to $Pn_{n+m}$. Note that, for the intermittent service, the period of time during which no MBMS session is available may change, which means that "m" may be a variable. The eNB is able to choose one of reserved values to be the service suspend indication, which may exactly indicate m MSAP occasions or mostly approximate to m MSAP occasions.

Figure 7:
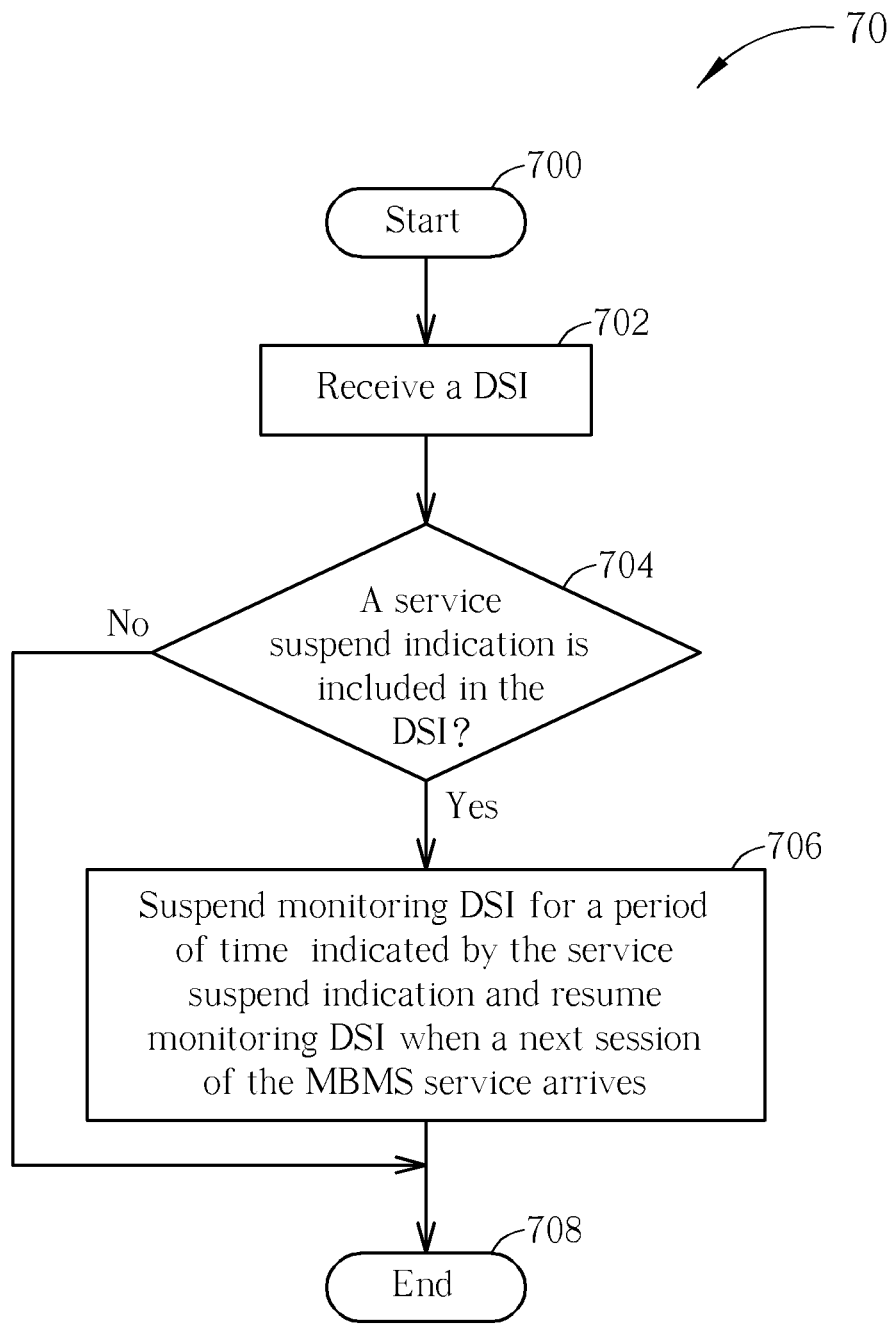

The eNB performing the process 60 cooperates with the UE performing an exemplary process 70 shown in FIG. 7, which is utilized for avoiding monitoring useless DSI at the UE side. The process 70 can be compiled into the program code 214. The process 70 includes the following steps:

Step 700: Start.

Step 702: Receive a DSI.

Step 704: Determine whether a service suspend indication is included in the DSI. If yes, perform Step 706; else, perform Step 708.

Step 706: Suspend monitoring DSI for a period of time indicated by the service suspend indication and resume monitoring DSI when a next session of the MBMS service arrives.

Step 708: End.

According to the process 70, after the UE receives the DSI at the MSAP occasion $Pn_{n+1}$, the UE determines whether the service suspend indication is in the DSI, in other words, the UE determines whether a specific value (used as a service suspend indication) is in the DSI. When the service suspend indication is in the DSI, the UE knows that the subscribed MBMS service is not available in m MSAP occasions during which DSIs carry useless information. Therefore, the UE suspends monitoring DSI for m MSAP occasions and resumes monitoring DSI when a next session of the MBMS service arrives. Through the process 60 and the process 70, the UE does not monitor DSI when the intermittent service is not available and thus power consumption of the UE is reduced.

Note that, the process 40 and the process 60 for the eNB side conform to the current specification that only one field for a stop indication of MTCH exists in a DSI, and there is no other field dedicated to a service stop/suspend indication. For this reason, when the MBMS service is stopped or suspended at the MSAP occasion $P_n$, the eNB has to wait until the next MSAP occasion $Pn_{n+1}$ to inform the UE about the service stop/suspend indication by using the field of stop indication of MTCH. Therefore, the UE still receives a DSI with useless scheduling information in order to receive the service stop/suspend indication.

In another example, the service stop/suspend indication is allocated in a dedicated field of a DSI, which is different from the field of stop indication of MTCH. Therefore, for a short session service, when the short session service is stopped at the MSAP occasion $P_n$, the eNB transmits a DSI including a stop indication of MTCH corresponding to the short session service and a service stop indication corresponding to the short session service to the UE at the MSAP occasion $P_n$. After the UE receives the DSI and knows the service stop indication is included in the DSI, the UE stops monitoring DSI. Similarly, for an intermittent service, when the eNB knows that the intermittent service is not available in m MSAP occasions at the MSAP occasion $P_n$, the eNB transmits a DSI including a stop indication of MTCH and a service suspend indication corresponding to the m MSAP occasions to the UE at the MSAP occasion $P_n$. After the UE receives the DSI and knows the service suspend indication is included in the DSI, the UE suspends monitoring DSI for m MSAP occasions, and resumes monitoring DSI when a new session of the intermittent service arrives.

Please note that the abovementioned steps of the processes 30, 40, 50, 60, 70 or other exemplary processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, through the exemplary processes performing by the eNB or the UE, UE does not require monitoring useless DSI when receiving a short session service or an intermittent service, and therefore power consumption is reduced.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of avoiding monitoring useless dynamic scheduling information (DSI) of multimedia broadcast multicast service (MBMS) for a network of a wireless communication system, the method comprising:
   when a short session service a user equipment of the wireless communication system subscribes to is stopped at a multicast channel subframe allocation pattern (MSAP) occasion, transmitting, by the network, a DSI including a service stop indication for indicating the short session service is stopped to the user equipment at a next MSAP occasion; and
   when an intermittent service the user equipment subscribes to is not available in a period of time at an MSAP occasion, transmitting, by the network, a DSI including a service suspend indication corresponding to the period of time to the user equipment at a next MSAP occasion.

2. A communication device of avoiding monitoring useless dynamic scheduling information (DSI) of multimedia broadcast multicast service (MBMS) in a wireless communication system, the communication device comprising:
   means for when a short session service a user equipment of the wireless communication system subscribes to is stopped at a multicast channel subframe allocation pattern (MSAP) occasion, transmitting a DSI including a service stop indication for indicating the short session service is stopped to the user equipment at a next MSAP occasion; and
   means for when an intermittent service the user equipment subscribes to is not available in a period of time at an MSAP occasion, transmitting a DSI including a service suspend indication corresponding to the period of time to the user equipment at a next MSAP occasion.

3. A method of avoiding monitoring useless dynamic scheduling information (DSI) of multimedia broadcast multicast service (MBMS) for a network of a wireless communication system, the method comprising:
   when a short session service a user equipment of the wireless communication system subscribes to is stopped at a multicast channel subframe allocation pattern (MSAP) occasion, transmitting, by the network, a DSI including a stop indication of multicast traffic channel (MTCH) corresponding to the short session service and a service stop indication for indicating the short session service is stopped to the user equipment at the MSAP occasion; and
   when an intermittent service the user equipment subscribes to is not available in a period of time at an MSAP occasion, transmitting, by the network, a DSI including a stop indication of MTCH corresponding to the intermittent service and a service suspend indication corresponding to the period of time to the user equipment at the MSAP occasion.

4. A communication device of avoiding monitoring useless dynamic scheduling information (DSI) of multimedia broadcast multicast service (MBMS) in a wireless communication system, the communication device comprising:
   means for when a short session service a user equipment of the wireless communication system subscribes to is stopped at a multicast channel subframe allocation pattern (MSAP) occasion, transmitting a DSI including a stop indication of multicast traffic channel (MTCH) corresponding to the short session service and a service stop indication for indicating the short session service is stopped to the user equipment at the MSAP occasion; and
   means for when an intermittent service the user equipment subscribes to is not available in a period of time at an MSAP occasion, transmitting a DSI including a stop indication of MTCH corresponding to the intermittent service and a service suspend indication corresponding to the period of time to the user equipment at the MSAP occasion.

* * * * *